United States Patent [19]

Ziegert

[11] 3,905,931
[45] Sept. 16, 1975

[54] WATER-BASED FILM LAMINATING ADHESIVE FROM POLY(ETHYL ACRYLATE), POLY(ETHYLENE/ACRYLIC ACID) AND 1,2-EPOXY RESIN

[75] Inventor: Richard Melvin Ziegert, Neenah, Wis.

[73] Assignee: American Can Company, Greenwich, Conn.

[22] Filed: May 9, 1974

[21] Appl. No.: 468,236

Related U.S. Application Data

[63] Continuation-in-part of Ser. No. 305,543, Nov. 10, 1972, abandoned.

[52] U.S. Cl.. 260/29.6 NR; 161/184; 260/29.6 ME; 260/29.6 RW; 260/836
[51] Int. Cl.² ............... C08L 63/00; C08L 31/02; C08L 23/08
[58] Field of Search ............... 260/29.6 NR, 29.3

[56] References Cited
UNITED STATES PATENTS
2,784,128    3/1957    Schroeder ............... 260/29.6 NR

*Primary Examiner*—Harold D. Anderson
*Attorney, Agent, or Firm*—Robert P. Auber; Frank S. Charlton; George P. Ziehmer

[57] ABSTRACT

A water-based laminating adhesive which cures, upon aging, to a water-resistant, thermally stable material of high bond strength when used as a laminant for a variety of polymer films. The adhesive is applied as an emulsion composition containing, as essential components, a poly (ethyl acrylate), a co-polymer of ethylene and acrylic acid, and an epoxy resin, each component being present within critical concentration limits.

9 Claims, No Drawings

WATER-BASED FILM LAMINATING ADHESIVE FROM POLY(ETHYL ACRYLATE), POLY(ETHYLENE/ACRYLIC ACID) AND 1,2-EPOXY RESIN

BACKGROUND OF THE INVENTION

This application is a continuation-in-part of Application Ser. No. 305,543, filed Nov. 10, 1972, now abandoned.

This invention relates to a water-based adhesive system for use in forming laminations of a variety of transparent synthetic polymeric film materials commonly utilized in the packaging industry. More particularly, the invention relates to a water-based adhesive composition containing components which, upon removal of the aqueous solvent medium, will cure by chemical reaction with the formation of high molecular weight polymers to an adhesive film of cured epoxy type polymeric resin, the resulting adhesive film being highly water-resistant, in contrast to water-based adhesive systems which do not cure by chemical interaction of the components.

Chemically reactive systems which, upon removal of the solvent medium, will cure by chemical reaction to form polymeric resinous adhesives have been used to form laminated packaging sheet materials of improved properties of permeability, toughness and resistance to moisture, grease, abrasion, flex cracking and the like. In general, however, the laminates showing the most desirable combination of properties have been constructed through the use of adhesive systems with an organic solvent such as toluene, acetone, ethyl acetate or similar organic materials of high solvent power for the types of resins normally found in the superior laminating adhesives. The use of such solvent-based adhesives, however, presents a number of serious problems, both in manufacture of the laminate and in its use in sensitive packaging situations. If the adhesive-forming components are dissolved in an organic solvent such as toluene, the solvent must be removed by evaporation after the solvent-based composition is applied to the web substrate. Such evaporation is, of course, accompanied by fire and health hazards and provision must be made either for venting of the solvent to the atmosphere, with the resulting undesirable air pollution associated with such a means of disposal, or for trapping and recovery of the solvent fumes, a procedure which is often economically impractical or extremely expensive.

Furthermore, it is often very difficult to remove all traces of solvent from the laminate constructions made with solvent-based adhesives. Solvent residues in the laminated film often make the film unsuitable for the packaging of products such as comestibles, both because of off-flavors imparted to the packaged product and because of health hazards related to the presence of toxic solvents in the packaging sheets.

It is an object of the present invention to provide a laminating adhesive composition which is free of the health, pollution and fire hazards associated with organic solvent-based adhesives, and which may be used in the construction of a variety of packaging film laminates which possess excellent properties for use in stringent packaging situations.

It is a further object to provide a water-based, curing type adhesive composition for use in laminated flexible packaging film constructions having excellent permeability properites and which will withstand stringent packaging requirements, including a high degree of resistance to water and conditions of high humidity, generally.

It is a further object to provide a laminating adhesive composition which contains only materials approved by the federal Food and Drug Administration for use in food packaging constructions.

Further objects will become apparent from the following specification and attached claims.

SUMMARY OF THE INVENTION

The adhesive composition of the present invention includes three major components, none of which, by itself, exhibits an outstanding combination of adhesive and water-resistant properties, nor does any combination of two of the three components in any proportion result in an adhesive composition which will provide laminated packaging sheet materials satisfactory for use in demanding packaging situations. Only when all three of the primary required components are present in the composition within certain proportion limits does the composition possess the desired adhesive property together with water-resistance and thermal stability necessary to provide laminated packaging sheet material constructions having very superior protective properties.

The three types of components which have been found necessary for inclusion in the adhesive composition of this invention are: an aqueous emulsion of a poly (ethyl acrylate), an aqueous emulsion of an ethylene-acrylic acid co-polymer, and an aqueous emulsion of a 1,2- epoxy resin referred to hereinafter simply as an epoxy resin. Other component materials which may be added in minor amounts to further enhance the properties of the adhesive are dipropylene glycol or similar polyhydroxy alcohol and a lower alcohol such as methyl, ethyl, n-propyl alcohol or isopropyl alcohol.

A primary requisite of a laminating adhesive is, of course, excellent adhesion to both of the sheet materials which are to be joined together. Many laminations, however, which exhibit excellent bond strength as measured on adhesion testing equipment at normal temperature and humidity, are found to be completely inadequate in commercial packaging situations due to conditions encountered in use which cause degeneration of the adhesive bond between the laminate layers. For example, it has been found that a number of adhesive compositions which have completely adequate bonding strength at normal temperature will soften and allow interlayer shifting of the bonded layers of a laminate when subjected to the frictional stresses and elevated temperatures of pouch forming, filling and sealing machinery, whereby wrinkles or bubbles are formed in the laminate, degrading its protective and aesthetic properties and making it unsatisfactory for use. Other adhesives with adequate bonding strength in laboratory tests have a tendency to flex crack during packaging and/or shipping of a product, causing failure of the protective properties of the packaging laminate. Other laminations fail when subjected to sunlight, to conditions of very high or very low humidity, high or low temperature, or to exposure of the laminate to boiling water, acidic or alkaline media, or solvent vapors.

Thus, although a high bond strength at room temperature between the adhesive and the sheet materials being laminated is an absolute requisite, this is not the only requirement, since it is also necessary that the adhesive bond remain strong under a variety of conditions which cause many otherwise promising adhesive compositions to fail.

DESCRIPTION OF A PREFERRED EMBODIMENT OF THE INVENTION

The poly (ethyl acrylate) component of the adhesive composition of this invention is a polymer of between about 500,000 and 1,500,000 molecular weight emulsified in an aqueous system by a non-ionic emulsifying agent. The $T_{300}$ value of the dried film is about 31 4° C. ($T_{300}$ is designated as the temperature at which the torsional modulus of an air-dried film of the subject material is 300 kg/cm².) The minimum film formation temperature of the poly (ethyl acrylate) is less than 0° C. The viscosity of a 46% solids emulsion of this polymer is approximately 50 cps at 20° C. Although the polymer is considered as a self cross-linking material, very little cross-linking occurs on drying the emulsion at temperatures below 200° F. For this reason, laminar bonds involving this material are normally neither heat-stable nor water-resistant.

Further, although the poly (ethyl acrylate) component by itself develops a strong adhesive bond between a variety of substrate films useful in forming laminated flexible packaging sheet materials because the initial, or unaged bond formed by this adhesive is satisfactorily strong, the bond strength is not increased appreciably upon aging, nor is the stability of the bond to moisture or high temperature improved by the aging procedure.

The ethylene-acrylic acid co-polymer resin component of the adhesive composition of this invention is a co-polymer formed of a blend of about 80 weight percent of ethylene and 20 weight percent of acrylic acid. The resulting co-polymer has a density of 0.96 gm./cc at 23.4° C., a DTA melting point of 89° C. and a melt index of 300 decigrams/minute at 190° C. The resin has an ultimate tensile strength of 1600 psi, an ultimate elongation of 400% and an index of brittleness of 80% at −15° C. The material is available from Morton Chemical Corporation, Chicago, Ill., under the trade designation 50-C-12 resin, as a water-based ammonia dispersion of about 20% solids concentration having a viscosity of about 1,800 cps at room temperature. This material has extremely low bond strength when utilized as an adhesive medium and so is, by itself, of no value as an adhesive medium.

The third component of critical importance in the adhesive composition of this invention is an emulsion of an epoxy resin. Epoxy resins have been prepared in a number of different manners, perhaps the most common of which is the reaction between epichlorohydrin and 2,2-bis(hydroxyphenyl)propane, commonly referred to hereinafter as bisphenol A, whereby a series of resins of different viscosity and epoxy equivalence is obtained by varying the component ratios and the reaction conditions. In addition to the epoxy resins of the epichlorohydrin-bisphenol A type, epoxidized novolac resins, formed by reaction of epichlorohydrin with the resinous reaction product of phenol (or substituted phenol) and formaldehyde, resinous reaction products from epichlorohydrin and an aliphatic polyol such as glycerol, 1,4-butanediol, poly (oxypropylene) glycol or similar polyalcoholic components, and resins obtained by epoxidation with peracetic acid, are of utility as the third critical component of the compositions of the present invention. As will be illustrated in detail hereinafter, a variety of epoxy resins, including, but not limited to, the members of the epoxy resin groups or types mentioned above, are effective components of the adhesive compositions of this invention. The preferred epoxy resin type for use in this invention is that prepared by reaction of epichlorohydrin with bisphenol A, and of the several resins of varying properties within the epichlorohydrin-bisphenol A group, those resins having a viscosity at 25° C. of between about 100 and 160 poises and epoxy equivalent (gram weight of resin containing one gram equivalent of epoxy) of between about 180 and about 200 are preferred. A particularly satisfactory epoxy resin of the epichlorhydrin-bisphenol A type has an epoxy content of 180–195, a viscosity at 25° C. of 100–160 poises, hydroxyl content equivalent (OH/100 grams of resin) of 0.06 and a refractive index of 1.570–1.575 at 25° C. The average molecular weight of the epoxide is approximately 380. About 85 gm. of the resin will esterify one mole of an acid. The refractive index of the resin is 1.570–1.575 at 25° C. The above resin, which is available from Shell Oil Company, Houston, Texas, under the trade designation Epon. 828 resin, is emulsified at 40% by weight resin concentration in water using 2.5% of an emulsifying agent sold by E. I. DuPont de Nemours & Company, Inc., Wilmington, Delaware, under the trade designation Elvanol 52–22. This epoxy material has no value, by itself, as a laminating adhesive, due to complete lack of bond strength.

In the composition of this invention, each of the above three essential components plays an important role. The poly (ethyl acrylate) component, hereinafter referred to as PEA, has the very desirable property of high initial adhesion or green tack, as well as contributing substantially to the final bond strength of the laminated structure. In direct contrast, although the ethylene-acrylic acid co-polymer, hereinafter referred to as EAA, exhibits a very low bond strength in a peel type test procedure, when cross-linked with the third component, an epoxy resin, and in the presence of the PEA component, the composition containing EAA forms an adhesive bond which is initially quite satisfactory and which increases substantially in strength upon aging, reaching and maintaining maximum values after a period of about ten days. In addition to the cross-linking which certainly occurs between the EAA component and the epoxy resin over a period of time, it is believed that a minor, but possibly significant amount of cross-linking also occurs between the PEA component and the epoxy resin, since the ultimate bond strength achieved with a blend of the three components is greater than that achieved with any proportions of the EAA and epoxy resin without the inclusion of some PEA. It is to be noted that, as the cross-linking type of cure proceeds, the bond formed between the plies of a laminar sheet construction not only increases in strength, but also becomes very substantially more resistant to the deteriorative effects of water, heat, abrasion, solvent vapor and the like. It has been found that substantial increases in bond strength are obtained over the first ten days of aging, after which the laminate remains relatively constant in bond strength for periods up to at least 4–6 months.

In addition to the three essential components hereinbefore mentioned, the preferred compositions of this invention also generally contain small but effective amounts of an aliphatic dihydric alcohol, preferably dipropylene glycol, and also of a low molecular weight alcohol such as methyl alcohol or ethyl alcohol. The inclusion of up to about 4% of the total composition weight of dipropylene glycol in the adhesive compositions of this invention results in an improved bond strength between a variety of flexible packaging film materials and so modifies the bond in such laminates that two film plies laminated by the adhesive will separate in a smooth, continuous motion upon the application of a separating force in excess of the bond strength, in contrast to some adhesive laminations which separate in a series of small staccato jerks under the influence of similar forces. In the preferred adhesive compositions, the amount of dipropylene glycol added is about 2% based on the total weight of a 25% solids composition, or about 8% based on the total solids weight of such a composition.

It has been found that due, at least in part, to the lowered surface tension which results from the addition of methyl, ethyl, normal propyl or isopropyl alcohol to the adhesive compositions of this invention, compositions containing from 5 to 25% by weight of such alcohols wet the polymer film substrates more readily than those compositions not containing an alcoholic component. The resultant adhesive coatings are therefore more easily and evenly spread on the substrate. Generally, the alcohol is satisfactorily effective in the 12–20% range and this range is preferred except in those cases wherein the substrate holds to tenaciously to the solvent that the removal of the last traces of alcohol from the finished laminate is undesirably difficult. In such cases, particularly when one of the substrates is a polyamide sheet, it is necessary to keep the alcohol content of the adhesive to a minimum, and it is recommended that not more than 5–8% of this component be included in the overall adhesive composition. Of the alcohols listed, ethyl alcohol is preferred, particularly in laminate structures which are to be used in food packaging.

As previously mentioned, the adhesive compositions of this invention are formulated as aqueous emulsions or suspensions, each of the major components being added to the overall composition as an emulsion or suspension with the solids composition of the final emulsion blend being adjusted within the range of about 15–40% solids, depending on the method selected for application of the adhesive to the substrate and the amount of adhesive which it is desired to deposit on the substrate. The adhesive may be applied to the substrate by any convenient method, including roll coating, reverse roll and rod coating, for example. It has been found quite convenient to apply the adhesive with a gravure etched cyclinder, in which case a solids concentration of about 25% has been found to be satisfactory, it being understood that the concentration may be varied substantially from the above figure as a matter of choice and expediency.

In the following considerations involving the concentrations of the individual solid components, including the PEA, the EAA, the epoxy resin and the glycol, the concentrations given will be in terms of percentages of the total solids content of the composition, these relative percentages remaining unchanged, of course, regardless of the water content of the overall composition. Thus, in that portion of the adhesive composition which constitutes the solids components, PEA will range from 55–80%, EAA from 4–20%, epoxy resin from 8–20% and the glycol component, preferably dipropylene glycol, may constitute up to about 16%. The total solids concentration, including all of these components may, as previously stated, vary from about 15–40% of the overall composition, the remainder being substantially water, with the desired percentage of alcohol included, as the case may be.

EXAMPLE 1.

The following Table I includes bond strength data for a lamination of polyvinyl chloride film to the saran side of saran (polyvinylidine chloride) coated low density polyethylene film using, as a control, a laminating adhesive of 25% solids concentration, the solids portion of which contained, on a weight basis, 67% of PEA, 11% of EAA, 14% of the epoxy resin of the epichlorohydrin-bisphenol A type hereinbefore stated as being particularly effective and 8% dipropylene glycol. The table gives comparative bond strength values for laminates including the above adhesive and for laminates in which the dipropylene glycol was omitted or replaced with other polyhydroxyalcohols as indicated in the table. In all cases, the base films were laminated with 2 lbs., solids basis, per ream of the respective adhesive composition under a pressure of approximately 8 lbs./sq. in. and at a temperature of 170° F. In forming the lamination, the adhesive composition, in a 25% solids suspension, was applied to one of the base sheets by means of an etched cylinder and the aqueous suspension medium removed in an oven at about 250° F. to leave a tacky coating of the resinous components on the base film. The second film was then pressed against the tacky adhesive surface by passage through a two roll nip under pressure at 170° F.

The bond strength values of the resulting laminates were obtained after varying storage periods by separating the two adhered layers on an Instron Testing Unit at a rate of 10 inches per minute pull speed. Force readings were integrated to give average bond strength in grams per inch of width of the sample.

TABLE I

| EFFECT OF GLYCOL COMPONENT ON BOND STRENGTH | | | | | |
|---|---|---|---|---|---|
| Adhesive | Bond Strength in gm./in., after | | | | |
|  | 3 days | 5 days | 10 days | 14 days | 19 days |
| Control, containing dipropylene glycol as 8% of total solids | 713 | 825 | 1003 | Film* Tear | Film* Tear |
| Containing no glycol | 487 | 572 | 495 | 399 | 334 |
| Containing tetra ethylene glycol as 8% of total solids | 620 | 710 | 842 | 856 | 981 |
| Containing glycerine as 8% of total solids | 390 | 457 | 832 | 900 | 718 |

*In this and subsequent tabulated bond strength data, the term "film teart" indicates a rupture of the base film occurred rather than failure of the adhesive bond.

It is evident from the data of Table I, above, that the presence of a small amount of a polyhydric alcohol in the adhesive composition has a beneficial effect on bond strength and that the bond strength increases substantially as the bond is aged over a period of days. In some cases, the aged adhesive bond strength exceeded the tensile strength of the base film, as indicated by the designation "film tear" in the tabulated data. Further tests have shown that, after a 10 day storage period, laminations made with the same adhesive composition as set forth above but with only 4% of dipropylene glycol (solids basis) displayed seal strengths about 20% lower than the preferred 8% glycol-containing composition, whereas a 12% glycol level produced seals 10% stronger than the 8% glycol composition. The glycol composition may range up to about 16% of the total solids weight in the preferred compositions, substantially higher percentages of glycol tending to overplasticize the composition and cause a reduction in seal strength and of water resistance in the laminate.

It should be noted that the bond strengths developed by the adhesive of this invention are somewhat influenced by the nip temperatures used in forming the pressure laminations. Temperatures above about 150° F. are to be preferred, higher temperatures being more desirable, since the bonds formed exhibit greater strength. Temperatures above about 200° F. should be avoided, however, since excessive heat tends to distort some of the films being laminated, with resultant puckering and poor functional properties of the laminates.

The adhesive compositions of this invention display excellent bond strength to a substantial variety of sheet materials commonly utilized in the packaging of food products as well as many other commodities. The preferred adhesive compositions are particularly effective in laminating plies of polyvinyl chloride, polyvinylidine chloride, polyethylene, nylon and Surlyn (a metallic ionomeric derivative of polyethylene obtainable from E. I. DuPont de Nemours Company, Inc., Wilmington, Del.).

EXAMPLE 2.

The following Table II contains data illustrating the bond strength formed in a variety of laminations formed using the same preferred adhesive composition as in Example 1, the lamination in each case being formed in substantially the same manner as previously described.

In the following table, PVC is 7.5 mil polyvinyl chloride film, LDPE is 2 mil low density corona discharge treated polyethylene film, PVDC on LDPE is polyvinylidine chloride coated 2 mil low density polyethylene film, Surlyn is a 2 mil corona discharge treated film of a metallic ionomeric polyethylene derivative, nylon is a 1 mil polyamide film, MDPE is 2 mil medium density corona discharge treated polyethylene film, A Mylar is a 0.5 mil polyester film, foil is an aluminum foil of 0.7 mil thickness, M Mylar is a 0.5 mil polyvinylidine chloride coated polyester film, PVDC on nylon is polyvinylidine chloride coated 1 mil polyamide film, PVDC on cellophane is polyvinylidine chloride coated 1.25 mil regenerated cellulose, M cellophane is nitrocellulose-coated 1.25 mil regenerated cellulose film, PP is 0.75 mil corona discharge treated polypropylene film, EVA is a 1.5 mil corona discharge treated film of a copolymer of ethylene and vinyl acetate, and Acclar is a 0.75 mil film of polyfluoride.

TABLE II

BOND STRENGTH OF A VARIETY OF LAMINATIONS

| Films Laminated by Adhesive | Lamination Bond Strength in gm./in. Measured After Aging as Shown | | | |
|---|---|---|---|---|
| | 10 Days | 20 Days | 20 Days* | 28 Days |
| PVC/PVDC on LDPE | 900 | 877 | (729) | 983 |
| Nylon/PVDC on LDPE | 570 | 475 | (443) | 449 |
| Nylon/Surlyn | 651 | 658 | (550) | 867 |
| Nylon/MDPE | 586 | 542 | (435) | 484 |
| Nylon/LDPE | 725 | 887 | (930) | 1043 |
| A Mylar/LDPE | 192 | 191 | (90) | 146 |
| A Mylar/Foil | 196 | 118 | (50) | — |
| M Mylar/LDPE | Film Tear | Film Tear | (50) | Film Tear |
| PVDC on Nylon/LDPE | 848 | 800 | (578) | 820 |
| PVDC on Nylon/Surlyn | 734 | 699 | (477) | 626 |
| PVDC on Cellophane/Foil | 431 | 166 | (30) | — |
| M Cellophane/LDPE | 60 | 56 | (0) | — |
| Foil/LDPE | 314 | 331 | (292) | 323 |
| PP/LDPE | 191 | Film Tear | (Film Tear) | Film Tear |
| PP/EVA | 162 | 181 | (Film Tear) | 180 |
| Acclar/LDPE | 157 | 77 | (56) | — |
| **M Mylar(printed)/Surlyn | 450, with ink transfer | 535, with ink transfer | — | — |

*The data in parentheses were obtained on samples aged 10 days at normal room temperature and humidity and then 10 days at 90°F. and 100% relative humidity to determine stability of the bond to extremely high humidity conditions.

**A laminate formed between Surlyn and saran-coated Mylar having the saran surface overall printed with a nitrocellulose base printing ink, the printed surface lying between the films and in direct contact with the adhesive.

It will be apparent from the above table that the adhesive compositions of this invention are very effective laminating adhesives for a variety of packaging films including PVC, PVDC, LDPE, MDPE, polyamides, metal ionomers of polyethylene and nitrocellulose ink coatings on polymer films, but are not equally effective on certain other sheet materials, including aluminum foil, nitrocellulose coated regenerated cellulose, polyfluoride film and plain polyester film.

The data from Table II also show that the adhesives of this composition form bonds of excellent strength to the surface of a printing ink of the nitrocellulose base type. Further tests have shown that the utility of the adhesives of this invention may be extended to include forming useful laminates with a wide variety of films if the films are first overall printed with an ink of the above type and if the ink film adheres to the base sheet with the required tenacity to avoid delamination at the ink to base sheet interface.

A consideration of the data in parentheses in Table II for the bond strength of 20 day aged samples wherein half of the aging was carried out under very high humidity and elevated temperature clearly shows that the preferred adhesive composition of this invention maintains a very high percentage of its original laminar bond strength even after extended exposure to very severe conditions of humidity and temperature. Such resistance to loss of bond strength is sometimes required of laminated sheet materials utilized in packaging of moist food products, for example. The retention of a high bond strength even after severe storage conditions is exhibited by the adhesive compounds within the preferred operating range of this invention, even though binary blends of the three major components, and ternary blends substantially outside the preferred range of compositions do not exhibit desirably high laminar bond strengths after storage for substantial periods under severe humidity conditions.

Those skilled in the adhesive and laminating arts are well aware that many adhesives which perform well on one or two specific films will form poor bonds with films of a different character, and it is quite unexpected that the compositions of this invention form strong laminating bonds with such a wide variety of packaging sheet materials. It is also particularly to be noted that the present invention achieves excellent water resistance properties in a variety of laminates through use of a water-based adhesive. Results comparable to those in Table II have hitherto been attained only through the use of solvent-based adhesives with their attendant health and pollution problems.

As earlier stated, the total solids content of the water-based adhesives of this invention will range in poly (ethyl acrylate) solids (PEA) from about 56 to about 80%, in ethylene-acrylic acid co-polymer solids (EAA) from about 4 to about 20% and in epoxy resin from about 8 to about 20%, preferred ranges of these components being 60–72%, 8–16% and 12–20%, respectively. The optional glycol component may range up to about 16% of total solids, about 8% being preferred. The concentration of the optional low molecular weight alcohol may range from 5 to 25%, this calculation being based on the total composition weight rather than on solids content, as has been the case with the previously mentioned components, with 12–20% of ethyl alcohol being present in the preferred compositions. The water component, together with ethyl alcohol, if present, will constitute between 60 and 85% by weight of the total composition. The most preferred composition, which forms laminations with a variety of base sheets, which laminates demonstrate optimum resistance to water degradation as well as superior permeability properties and excellent machine workability, has a solids content which contains 67% of PEA (solids), 11% EAA (solids), 14% epoxy resin (solids), and 8% dipropylene glycol (DPG), while the dispersion medium, calculated on total composition weight, is composed of 16% ethyl alcohol and 59% water.

EXAMPLE 3.

In a series of tests designed to illustrate the superior adhesion and water resistance of cured laminates made with the adhesives of this invention, a series of compositions were prepared in which the three essential components, PEA, EAA and the epichlorohydrin-bisphenol A epoxy resin, utilized in previous examples, were varied in their proportions over wide limits and tested for adhesion and for water resistance. In each case, the adhesive composition was compounded to contain 20% total solids, including dipropylene glycol at a level of 7–11% if the total solid weight, the suspension medium being water with ethyl alcohol added in an amount equal to 18% of the total composition. The adhesive composition was applied to a base film of polyvinyl chloride by means of a gravure etched cylinder in an amount equivalent to 1.8–2.0 lbs. of solids (i.e., 9–10 lbs. of the 20% aqueous composition) per ream (3,000 sq. ft.) of the film. About 2lbs. of adhesive per ream of the base film have been found optimal, although amounts between about 1 lb. and 4 lbs. may be used. Lower amounts tend to give uneven and unsatisfactory adhesion, while higher amounts are uneconomical both in material and in energy requirements for water removal. The wet, coated sheet was dried in an oven at 240° F. and the adhesive-coated side contacted with the saran side of a saran-coated low density polyethylene sheet material. The combined sheets were passed at 10 feet per minute through a pressure nip between two laminating rolls maintained at 160° F. The following Table III contains data on the relative proportions of the three primary components and the glycol in each of the adhesive compositions and also on the bond strength and water resistance developed in the laminated sheet constructions prepared as described above. Bond strength was determined in the manner previously described. Water resistance was rated from poor to excellent according to the change in bond strength as a result of 3 days of storage at 90° F. and 100% relative humidity.

TABLE III

EFFECT OF ADHESIVE COMPOSITION ON BOND STRENGTH AND WATER RESISTANCE

| Composition | Component Proportions in % of Total Solids | | | | Bond Strength in gm./in. | | Water Resistance |
|---|---|---|---|---|---|---|---|
| | PEA | EAA | Epoxy | DPG | 4 Hours | 4 Days | |
| 1 | 22.9 | 10.0 | 59.7 | 7.4 | 248 | 264 | Excellent |
| 2 | 44.4 | 9.7 | 38.6 | 7.3 | 361 | 355 | Fair |
| 3 | 64.7 | 9.4 | 18.7 | 7.2 | 499 | 544 | Good |
| 4 | 84.0 | 9.1 | 0 | 6.9 | 362 | 447 | Poor |
| 5 | 63.8 | 27.8 | 0 | 8.4 | 162 | 293 | Poor |
| 6 | 32.6 | 56.7 | 0 | 10.7 | 5 | 23 | Excellent |
| 7 | 28.5 | 37.2 | 25.0 | 9.3 | 25 | 35 | Excellent |
| 8 | 25.4 | 22.1 | 44.2 | 8.3 | 213 | 132 | Excellent |
| 9 | 42.2 | 18.4 | 31.5 | 7.9 | 245 | 266 | Fair |
| 10 | 55.0 | 23.9 | 13.0 | 8.1 | 272 | 284 | Excellent |
| 11 | 38.0 | 31.9 | 21.2 | 8.9 | 95 | 140 | Good |
| 12 | 61.0 | 13.8 | 17.8 | 7.4 | 562 | 545 | Good |
| 13 | 76.8 | 15.7 | 0 | 7.5 | 299 | 243 | Poor |
| 14 | 53.7 | 21.3 | 17.0 | 8.0 | 305 | 272 | Excellent |

Examination of the data in Table III reveals that blends containing high percentages of PEA in combination with EAA show excellent adhesive bond strength, which decreases with increasing percentages of EAA, as shown in compositions 4, 13, 5 and 6. Water resistance of such blends is generally poor, however, making the laminates unsatisfactory, for use in packaging of moist foods, for example.

Blends in which the PEA component is relatively low (compositions 1, 6, 7, 8) and which are therefore relatively rich in EAA and epoxy resin are deficient in laminar bond strength and therefore are unsatisfactory for most packaging requirements, in spite of the fact that the water resistance of such adhesive compositions is excellent, as indicated by the fact that the bonds lose little, if any, of their original strength on exposure to very high humidity.

Increasing the proportion of PEA in compositions having substantial percentages of both EAA and epoxy resin results in a substantial increase in bond strength, as shown in data for compositions, 1, 2 and 3, but this desired effect must be balanced against an appreciable degradation in the property of water resistance, which is particularly noticeable when the epoxy resin component is reduced to zero as in composition 4.

EXAMPLE 4

In order to demonstrate the utility of a variety of epoxy resin types in the compositions of this invention, a series of adhesive emulsions, each containing 25% solids, 16% ethyl alcohol and 59% water, was prepared. In each case the solids portion of the composition contained, on a weight basis, 67% of PEA, 11% of EAA, 8% of dipropylene glycol and 14% of a selected epoxy resin, as shown in the following Table IV. The compositions were utilized as adhesives for laminating polyvinyl chloride film to the saran side of saran (polyvinylidine chloride) coated low density polyethylene and also for laminating nylon film to low density polyethylene. In forming the laminations, one of the films was coated with 8 pounds of the adhesive emulsion per ream of 3,000 sq. ft. of film. This amount is equivalent to 2 pounds of adhesive per ream on a dry basis. The adhesive was applied to the film by hand using a wire-wound rod as a metering device in a typical hand draw-down procedure. The emulsion coating was dried in each case to a tacky film using an electric heat gun and the other film of the laminate applied in overlying relation to the tacky adhesive and pressed down with a hand roller. The combined laminate was then passed through a two roll machine nip maintained at 170° F. and 8 lbs. per sq. in. of pressure. Bond strengths of the laminates were tested after 24 hours and after 10 days, and values are recorded in the following Table IV in gm./in. as measured on an Instron tester.

TABLE IV
EFFECT OF VARIOUS EPOXY RESINS ON BOND STRENGTH

| Epoxy Resin | Epoxy Equivalent | Viscosity in Poises at 25° C. | PVC/PVDC-PE Bond Strength | | Nylon/LDPE Bond Strength | |
|---|---|---|---|---|---|---|
| | | | 1 Day | 10 Days | 1 Day | 10 Days |
| A | 180–195 | 100–160 | 409 | 654 | 218 | 347 |
| | 185–196 | 120–160 | 455 | 687 | 250 | 374 |
| B | | | | | | |
| C | 182–190 | 110–140 | 504 | 565 | 255 | 344 |
| D | 187 max. | 50–64 | 435 | 620 | 315 | 341 |
| E | 172–178 | 40–60 | 413 | 571 | 330 | 380 |
| F | 182–189 | 70–110 | 414 | 585 | 172 | 323 |
| G | 172–179 | 14–20 | 469 | 616 | 230 | 353 |
| H | 150–170 | 1–2 | 390 | 544 | 143 | 305 |
| I | 400–455 | 20–50 | 438 | 463 | 166 | 278 |
| J | 134 | 0.1 | 524 | 620 | 119 | 428 |
| K | 140 | 3.5 | 541 | 542 | 166 | 372 |
| L | 190–198 | 170–225 | 482 | 651 | 289 | 344 |
| M | 385–500 | Solid | 457 | 644 | 272 | 426 |

In the above table, resins A, B, C, D, E, F, I, L and M are of the epichlorohydrin-bisphenol A type, formed by reaction of epichlorohydrin with bisphenol A under conditions varied to produce resinous reaction products of varying physical properties as shown in the table. Resin G, in the table, is an epoxidized novolac resin, formed by epoxidation of a novolac resin made by reacting phenol with formaldehyde under acidic conditions. Resin H is an epoxy resin of the polyol type, and comprises a mixture of di- and tri- epoxides obtained by condensation of epichlorohydrin and glycerol. Resin J is obtained by reaction of epichlorohydrin and butanediol, and resin K is 3,4-epoxycyclohexylmethyl 3,4-epoxycyclohexane carboxylate resin.

It will be noted from the adhesive peel strength test values in Table IV that a variety of epoxy resin types are effective components of the adhesive compositions of this invention, as shown by the fact that the peel strength values improved on aging, indicating chemical cross-linking of the epoxy component with at least one of the other components of the composition.

If consideration is given to the requirements of the plant operations in commercial manufacture of laminated film structures, however, it becomes apparent that certain of the epoxy resins are simpler and more desirable to use than others because of the relative ease of formation of the adhesive composition from the components and/or the stability or pot life of the composition. The high viscosity epoxy resins, particularly those of a viscosity in excess of about 160 poises at 25° C., such as the resin L in Table IV and the solid resin M in the same table, require the use of undesirably high temperatures in the formulation of the adhesive compositions which incorporate them. This has been proven to be a disadvantage in commercial manufacturing operations. Furthermore, the epoxy resins of very low viscosity, such as resins D, E, F, G, H, I, J and K in Table IV, all having viscosities at 25° C. of less than 100 poises, have proven to be relatively difficult to emulsify and tend to separate from the other components of the adhesive composition during the film laminating operations. The difficulty in maintaining the adhesive in the form of a homogeneous emulsion during manufacturing operations makes the use of such resins somewhat less desirable than those epoxy resins having viscosities between about 100 and 160 at 25° C., even though resins of both higher and lower viscosities have been shown to impart high bond strength to adhesively bonded laminar structures, which strength is of particular significance upon aging of the laminates.

In summary, a wide range of epoxy resins has been shown to have utility as the third essential component of the adhesive compositions of this invention, including epoxy resins of a variety of types and a wide range of physical properties. The epoxy resins which are preferred in the present compositions for manufacturing reasons are those having a viscosity of between about 100 and 160 poises at 25° C., and particularly such resins made by reaction of epichlorohydrin and bisphenol A.

It is evident from the data in the tables herein presented that an optimum balance of laminar bond strength and water resistance heretofore attained only with solvent based adhesive systems, is achieved by use of the aqueous adhesives of this invention containing PEA, EAA and an epoxy resin, each present within the critical concentration limits hereinbefore set forth, and that the invention is best exemplified by those compositions which are preferred by virtue of the inclusion therein of the optional dihydric alcohol and low molecular weight alcohol, each of which contributes certain additional desirable properties to the adhesives, as previously described and illustrated.

Having now described my invention in detail and presented a number of illustrative embodiments thereof, it is obvious that many modifications may be made without departing from its spirit. It is therefore to be understood that the invention is not to be limited except as defined in the appended claims.

I claim:

1. A water-based adhesive composition which, on removal of water, cures to a water-resistant, thermally stable adhesive, consisting essentially of, on a solids weight basis, a suspension of between 15 and 40% solids content in an aqueous medium said solids content consisting essentially of between about 55 and about 80% of poly (ethyl acrylate), between about 4% and about 20% of a co-polymer of about 80 weight percent of ethylene and about 20 weight percent of acrylic acid, and between 8% and about 20% of a 1,2-epoxy resin.

2. A composition according to claim 1, wherein said epoxy resin is a reaction product of epichlorohydrin and 2,2-bis(hydroxyphenyl)propane.

3. A composition according to claim 2, wherein said epoxy resin has a viscosity at 25° C. of between about 100 and 160 poises.

4. A composition according to claim 1, including, based on the weight of said solid content, between 4% and 16% of a liquid aliphatic dihydric alcohol.

5. A composition according to claim 4 wherein said dihydric alcohol is dipropylene glycol.

6. A composition according to claim 5 including on the basis of the total weight of the composition between 5 and 25% of a low molecular weight alcohol chosen from the group consisting of methyl alcohol, ethyl alcohol, normal propyl alcohol, isopropyl alcohol and mixtures thereof.

7. A composition according to claim 5 wherein said poly (ethyl acrylate) is present in an amount between 60 and 72%, said co-polymer of ethylene and acrylic acid is present in an amount between 8 and 16%, said epoxy resin is present in an amount between 12 and 20% and said dipropylene glycol is present in an amount between 4 and 12%, based on the weight of the total solids present in the composition.

8. A composition according to claim 6 wherein said low molecular weight alcohol is ethyl alcohol and is present in an amount between 12 and 20%, based on the total weight of the composition.

9. A composition according to claim 8 wherein said poly (ethyl acrylate) constitutes about 67%, said ethylene-acrylic acid co-polymer about 11%, said epoxy resin about 14%, said dipropylene glycol about 8% of total solids present in the composition, said ethyl alcohol about 18% of the overall weight of the composition and said aqueous medium about 57% of the overall weight of said composition.

* * * * *